(12) United States Patent
Savage et al.

(10) Patent No.: US 7,163,746 B2
(45) Date of Patent: Jan. 16, 2007

(54) CONDUCTIVE POLYMERS ON ACICULAR SUBSTRATES

(75) Inventors: Dennis J. Savage, Rochester, NY (US); Debasis Majumdar, Rochester, NY (US); Gary S. Freedman, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 179 days.

(21) Appl. No.: 10/167,638

(22) Filed: Jun. 12, 2002

(65) Prior Publication Data

US 2003/0232188 A1 Dec. 18, 2003

(51) Int. Cl.
*B32B 5/16* (2006.01)
*B05D 7/00* (2006.01)

(52) U.S. Cl. ............ 428/407; 428/325; 428/328; 428/329; 428/330; 428/331; 427/212; 427/221

(58) Field of Classification Search ........... 428/323, 428/327, 403, 407, 325, 328, 329, 330, 331; 427/212, 215, 221
See application file for complete search history.

(56) References Cited

U.S. PATENT DOCUMENTS

| | | | |
|---|---|---|---|
| 3,966,987 A * | 6/1976 | Suzuki et al. ............ 252/500 |
| 4,070,189 A | 1/1978 | Kelley et al. |
| 4,203,769 A | 5/1980 | Guestaux |
| 4,731,408 A | 3/1988 | Jasne |
| 4,798,686 A * | 1/1989 | Hocker et al. ............ 252/500 |
| 4,880,703 A | 11/1989 | Sakamoto et al. |
| 4,987,042 A | 1/1991 | Jonas et al. |
| 5,006,451 A | 4/1991 | Anderson et al. |
| 5,093,439 A | 3/1992 | Epstein et al. |
| 5,221,497 A | 6/1993 | Watanabe et al. |
| 5,273,822 A | 12/1993 | Hayashi et al. |
| 5,284,714 A | 2/1994 | Anderson et al. |
| 5,300,575 A | 4/1994 | Jonas et al. |
| 5,312,681 A | 5/1994 | Muys et al. |
| 5,340,676 A * | 8/1994 | Anderson et al. ............ 430/63 |
| 5,350,448 A | 9/1994 | Dietz et al. |
| 5,354,613 A | 10/1994 | Quintens et al. |
| 5,366,855 A | 11/1994 | Anderson et al. |
| 5,370,981 A | 12/1994 | Krafft et al. |
| 5,372,924 A | 12/1994 | Quintens et al. |
| 5,391,472 A | 2/1995 | Muys et al. |
| 5,403,467 A | 4/1995 | Jonas et al. |
| 5,439,785 A | 8/1995 | Boston et al. |
| 5,443,944 A | 8/1995 | Krafft et al. |
| 5,585,037 A | 12/1996 | Linton |
| 5,628,932 A | 5/1997 | Linton |
| 5,665,498 A | 9/1997 | Savage et al. |
| 5,674,654 A | 10/1997 | Zumbulyadis et al. |
| 5,693,259 A | 12/1997 | Otaki |
| 5,716,550 A | 2/1998 | Gardner et al. |
| 5,750,249 A * | 5/1998 | Walther et al. ............ 428/328 |
| 5,849,472 A * | 12/1998 | Wang et al. .............. 430/531 |
| 5,955,250 A * | 9/1999 | Christian et al. ........... 430/528 |
| 6,004,483 A | 12/1999 | Jonas et al. |
| 6,060,230 A * | 5/2000 | Christian et al. ........... 430/530 |
| 6,074,807 A * | 6/2000 | Eichorst et al. ............ 430/529 |
| 6,168,911 B1 * | 1/2001 | Lelental et al. ............ 430/529 |
| 6,174,623 B1 * | 1/2001 | Shackle ................. 429/218.1 |
| 6,201,051 B1 | 3/2001 | Mager et al. |
| 6,203,972 B1 * | 3/2001 | Katoh et al. ............... 430/619 |
| 6,291,535 B1 | 9/2001 | Watanabe et al. |

FOREIGN PATENT DOCUMENTS

| | | |
|---|---|---|
| DE | 100 17 879 A1 | 10/2001 |
| EP | 0 962 943 A1 | 12/1999 |
| EP | 1 010 733 A2 | 6/2000 |
| WO | 00/74074 A1 | 12/2000 |

* cited by examiner

*Primary Examiner*—H. Thi Le
(74) *Attorney, Agent, or Firm*—Lynne M. Blank

(57) ABSTRACT

The present invention relates to an electronically conductive particle comprising an acicular substrate in contact with an electronically conductive polymer. Another embodiment comprises an article comprising electronically conductive particles comprising an acicular substrate in contact with an electronically conductive polymer. A further embodiment comprises a method for making electronically conductive particles comprising providing at least one acicular substrate, combining at least one monomer with said at least one acicular substrate, and mixing at least one catalyst with said at least one acicular substrate and said at least one monomer.

59 Claims, No Drawings

CONDUCTIVE POLYMERS ON ACICULAR SUBSTRATES

FIELD OF THE INVENTION

The invention relates to electronically conductive particles comprising conductive polymer coatings on acicular substrates.

BACKGROUND OF THE INVENTION

Problems associated with the formation and discharge of electrostatic charge during the manufacture and utilization of insulating materials have been recognized for many years. The problem is particularly acute in the photographic industry. The accumulation of charge on film or paper surfaces leads to the attraction of dust, which can produce physical defects. The discharge of accumulated charge during or after the application of the sensitized emulsion layers can produce irregular fog patterns or static marks in the emulsion. The severity of the static problems has been exacerbated greatly by the increases in sensitivity of new emulsions, increases in coating machine speeds, and increases in post-coating drying efficiency. The charge generated during the coating process results primarily from the tendency of the webs of high dielectric constant polymeric film base to charge during winding and unwinding operations (unwinding static), during transport through the coating machines (transport static), and during post-coating operations such as slitting and spooling. Static charge can also be generated during the use of the finished photographic product. In an automatic camera, the winding of film out of and back into the film cassette, especially in a low relative humidity environment, can result in static charging. Similarly, high speed automated film processing can result in static charge generation. Sheet films, such as X-ray films, are especially subject to static charging during removal from light-tight packaging.

It is generally known that electrostatic charge can be dissipated effectively by incorporating one or more electrically conductive antistatic layers into the film structure. Antistatic layers can be applied to one or both sides of the film base as subbing layers either beneath or on the side opposite the light-sensitive silver halide emulsion layers. An antistatic layer can alternatively be applied as an outer coated layer either over the emulsion layers or on the side of the film base opposite the emulsion layers or both. For some applications, the antistatic agent can be incorporated into the emulsion layers. Alternatively, the antistatic agent can be directly incorporated into the film base itself.

A wide variety of electrically conductive materials can be incorporated into antistatic layers to produce a wide range of conductivities. Most antistatic layers traditionally used for photographic applications employ ionic conductors. Electric charge is transferred in ionic conductors by the bulk diffusion of charged species through an electrolyte. Antistatic layers containing electronic conductors also have been described. Because the conductivity of electronic conductors depends predominantly on electronic mobility rather than ionic mobility, their observed electrical conductivity is independent of relative humidity and only slightly influenced by ambient temperature. Antistatic layers containing various conjugated polymers, conductive carbon particles or semiconductive inorganic particles have also been described.

Of the various types of electronic conductors, electrically conducting metal-containing particles, such as semiconducting metal oxides, are particularly effective when dispersed in suitable polymeric film-forming binders in combination with polymeric non-film-forming particles as described in U.S. Pat. Nos. 5,340,676, 5,466,567, 5,700,623. Binary metal oxides doped with appropriate donor heteroatoms or containing oxygen deficiencies have been disclosed in the prior art to be useful in antistatic layers for photographic elements, for example, U.S. Pat. Nos. 4,275,103, 4,416,963, 4,495,276, 4,394,441, 4,418,141, 4,431,764, 4,495,276, 4,571,361, 4,999,276, 5,122,445, 5,294, 525, 5,382,494, 5,459,021, 5,484,694 and others. Suitable disclosed conductive metal oxides include zinc oxide, titania, tin oxide, alumina, indium oxide, silica, magnesia, zirconia, barium oxide, molybdenum trioxide, tungsten trioxide, and vanadium pentoxide. Preferred doped conductive metal oxide granular particles include antimony-doped tin oxide, fluorine-doped tin oxide, aluminum-doped zinc oxide, and niobium-doped titania. In addition, conductive ternary metal oxides have been disclosed in U.S. Pat. No. 5,368,995, which include zinc antimonate and indium antimonate. Other conductive metal-containing granular particles including metal borides, carbides, nitrides and suicides have been disclosed in Japanese Kokai No. JP 04-055,492.

One deficiency of such granular electronic conductor materials is that, especially in the case of semiconductive metal-containing particles, the particles usually are highly colored which render them unsuitable for use in coated layers on many photographic supports, particularly at high dry weight coverage.

The use of "fibrous" or "fibrilar" conductive materials in imaging elements has been taught or disclosed in the prior art. A conductive backing or subbing layer for silver halide photographic films prepared by coating an aqueous dispersion of a colloidal gel of "amorphous" vanadium pentoxide, preferably silver-doped vanadium-pentoxide, onto a film support is described in U.S. Pat. Nos. 4,203,769 and 5,439, 785. Colloidal vanadium pentoxide gel consists of entangled conductive microscopic fibrils or ribbons that are 0.005–0.01 µm wide, about 0.001 µm thick, and 0.1–1 µm in length. Conductive layers containing colloidal vanadium pentoxide exhibit low surface resistivities at very low dry weight coverages, low optical losses, and excellent adhesion to the support. However, since colloidal vanadium pentoxide dissolves in developer solution during wet processing of photographic products, it must be protected by a nonpermeable, hydrophobic overlying barrier layer as taught in U.S. Pat. Nos. 5,006,451, 5,284,714, and 5,366,855.

Composite conductive particles consisting of a thin layer of conductive metal-containing particles deposited onto the surface of non-conducting transparent core particles are known in the art. These composite particles provide a lightly colored material with sufficient conductivity. For example, composite conductive particles consisting of two dimensional networks of fine antimony-doped tin oxide crystallites in association with amorphous silica deposited on the surface of much larger, non-conducting metal oxide particles (e.g., silica, titania, etc.) and a method for their preparation are disclosed in U.S. Pat. Nos. 5,350,448, 5,585,037 and 5, 628,932. Alternatively, metal containing conductive materials, including composite conducting particles, with high aspect ratio can be used to obtain conductive layers with lighter color due to reduced dry weight coverage as described, for example, in U.S. Pat. Nos. 4,880,703 and 5,273,822. However, there is difficulty in the preparation of conductive layers containing composite conductive particles, especially composite particles having a high aspect ratio, since the dispersion of these particles in any vehicle using conventional wet milling dispersion techniques and traditional steel or ceramic milling media often results in wear or abrasion of the thin conducting layer from the core particle and/or reduction of the aspect ratio. Fragile composite conductive particles often cannot be dispersed effectively because of limitations on milling intensity and duration dictated by the need to minimize degradation of the morphology and electrical properties as well as the introduction of attrition-related contamination from the dispersion process.

Electrically conducting polymers have recently received attention from various industries because of their electronic conductivity. Since the discovery in 1977 that polyacetylene, when doped, has conductivity $10^9$ times greater than the undoped polymer, many new materials have been synthesized and commercialized. The commercialization exemplified by the following list of materials illustrates the growth in the area of conductive polymers.

Doped polyaniline is used as a conductor and for electromagnetic shielding of electronic circuits. Polyaniline is also manufactured as a corrosion inhibitor. Poly(ethylenedioxythiophene)(PEDOT) doped with polystyrenesulfonic acid is manufactured as an antistatic coating material to prevent electrical discharge exposure on photographic emulsions and also serves as a hole-injecting electrode material in polymer light-emitting devices. Poly(phenylenevinylene) derivatives have been major candidates for the active layer in the manufacture of electroluminescent displays for use in applications such as mobile telephone displays. Poly(dialkylfluorene) derivatives are used as the emissive layer in full-color video matrix displays. Poly(thiophene) derivatives are promising field-effect transistors. Poly(pyrrole) has been tested as a microwave-absorbing "stealth" (radar-invisible) screen coating and also as the active thin layer of various sensing devices. Electronically conductive polymers show very high conductivity when doped. Suitable dopants include halogens such as iodine, chlorine, and bromine. Other suitable dopants include inorganic mineral acids such as hydrochloric acid and various strong organic acids such as methanesulfonic acid, camphorsulfonic acid, and styrenesulfonic acid.

Although many electronically conductive polymers are highly colored and are less suited for photographic applications, some of these electrically conducting polymers, such as substituted or unsubstituted pyrrole-containing polymers, as mentioned in U.S. Pat. Nos. 5,665,498 and 5,674,654, substituted or unsubstituted thiophene-containing polymers as mentioned in U.S. Pat. Nos. 5,300,575, 5,312,681, 5,354,613, 5,370,981, 5,372,924, 5,391,472, 5,403,467, 5,443,944, 5,575,898, 4,987,042 and 4,731,408, and substituted or unsubstituted aniline-containing polymers as mentioned in U.S. Pat. Nos. 5,716,550, 5,093,439 and 4,070,189 are transparent and not prohibitively colored, at least when coated in thin layers at moderate coverage. Because of their electronic conductivity instead of ionic conductivity, these polymers are conducting even at low humidity. It has been observed in the industry that loss of electrical conductivity after wet processing may increase dirt attraction to processed films which, when printed, may cause undesirable defects on the prints. The present polymers can retain sufficient conductivity even after wet chemical processing to provide what is known in the art as "process-surviving" antistatic characteristics to the photographic support to which they are applied. Unlike metal-containing semiconducting particulate antistatic materials (e.g., antimony-doped tin oxide), the aforementioned electrically conducting polymers are less abrasive, and environmentally more acceptable (due to absence of heavy metals). However, it has been reported in U.S. Pat. No. 5,354,613 that the mechanical strength of a thiophene-containing polymer layer is not sufficient and can be easily damaged.

Electrically conductive layers are also commonly used in imaging elements for purposes other than providing static protection. Thus, for example, in electrostatographic imaging it is well known to utilize imaging elements including a support, an electrically-conductive layer that serves as an electrode, and a photoconductive layer that serves as the image-forming layer. Electrically conductive agents utilized as antistatic agents in photographic silver halide imaging elements are often also useful in the electrode layer of electrostatographic imaging elements.

Besides imaging elements, other display products and accessories, particularly those involving electronic display, may require electrical conductivity. Glass and plastics molded parts become electrostatically charged by friction or application of charges, for example electron beams in TV picture tubes. As a result of these charges the parts rapidly become covered with dust due to attraction of dust, which is undesirable in practice. To achieve protection, the parts can be coated with an antistatic coating. In addition, a screening effect against electromagnetic radiation, as is emitted for example from cathode ray tubes, is also achieved with sufficiently conducting materials. High conductivity may also be required for certain accessories in electronic display products, in order to be part of the electrical circuitry.

For practical use these coatings must also have a sufficient mechanical strength and adhesion. Especially in the case of glass as a carrier, the layers must be sufficiently durable in order to avoid damage to the coating during cleaning or other usage of the coated surfaces resulting in the loss of the antistatic and/or conducting effect. Electrically conducting polymers, for example polythiophenes, for producing antistatic and/or conducting coatings on glass are known from the literature. However, it has been noted in U.S. Pat. Nos. 6,201,051 and 6,004,483, that these coatings are not sufficiently scratch-resistant in practice for some applications.

As indicated above, the prior art on electrically-conductive layers in imaging elements is extensive and a very wide variety of different materials have been proposed for use as the electrically-conductive agent. There is still, however, a critical need in the art for improved electrically-conductive layers which are useful in a wide variety of imaging elements, which can be manufactured at reasonable cost, which are environmentally benign, which are durable and abrasion-resistant, which are effective at low coverage, which are adaptable to use with transparent imaging elements, which do not exhibit adverse sensitometric or photographic effects, and which maintain electrical conductivity even after coming in contact with processing. Thus, for a wide variety of applications there is a critical need for conductive particles; which are electronically conductive, transparent, durable, dispersible for easy formulation and which have a high aspect ratio in order to provide necessary conductivity at a low coverage without any objectionable color.

SUMMARY OF THE INVENTION

These and other objects of the invention are accomplished by providing an electronically conductive particle comprising an acicular substrate in contact with an electronically conductive polymer. Another embodiment comprises an article comprising electronically conductive particles comprising an acicular substrate in contact with an electronically conductive polymer. A further embodiment comprises a method for making electronically conductive particles comprising providing at least one acicular substrate, combining at least one monomer with said at least one acicular substrate, and mixing at least one catalyst with said at least one acicular substrate and said at least one monomer.

The invention has numerous advantages. Since the particle of the invention comprises electronically conductive polymers, the conductivity provided is humidity independent. Therefore, any conductive layer comprising these particles can maintain their conductivity in a wide variety of geographic locations and seasons. Electronic conductivity also ensures "process-surviving" antistatic characteristics for imaging elements, which undergo wet chemical processing. The use of an electronically conductive polymer in the present invention also provides an environmentally attractive option to the use of heavy metal-containing conductive particles that may need special materials management during handling, recycling and disposal. The high aspect ratio of the acicular substrate of the invention also provides an advantage. Conductive particles with high aspect ratio can be made contiguous at a low coverage, thus, ensuring high conductivity at low coverage. This feature can reduce the overall cost of the conductive layer. Moreover, low coverage of the conductive particles implies less objectionable color of the conductive layer. The acicular substrate of the invention can be chosen to be an inorganic material with desirable mechanical properties. By choosing a rugged and durable substrate, the disadvantage of a mechanically fragile conductive polymer is easily obviated in the present invention. The inorganic substrate of the invention not only adds strength to the conductive particle but also can improve scratch and abrasion resistance, coefficient of friction, writability, spliceability and other characteristics of imaging elements, when incorporated in outermost conductive layers. Another advantage of the invention is realized from the dispersibility of the particle in common organic media. This allows for the formulation of these particles in a variety of binders and the ability to coat them on a wide range of supports using any of the known methods of the art. These and other advantages of the invention will be apparent from the detailed description below.

DETAILED DESCRIPTION OF THE INVENTION

The conductive particle of the invention comprises two essential components, namely an electronically conductive polymer or component A and an acicular substrate or component B. In a preferred embodiment the conductive particle is dispersed in a suitable medium or component C.

Component A can be any electronically conductive polymer, such as polyisothianaphthene, polypyrrole, polythiophene and polyaniline and substituted or unsubstituted derivatives thereof. However, polypyrrole, polythiophene and polyaniline containing polymers and their substituted and unsubstituted derivatives are preferred for the present invention because they are inexpensive, easily handled and not prohibitively colored, at least when coated in thin layers at moderate coverage. A more preferred polythiophene for use according to the present invention contains thiophene nuclei substituted with at least one alkoxy group, e.g. $C_1$ through $C_{12}$ alkoxy group or —O(—CH$_2$CH$_2$O)nCH$_3$ group, n being 1 to 4, or the thiophene nucleus is ring closed over the oxygen atoms with an alkylene group including such group in substituted form.

Examples of preferred polythiophenes for use according to the present invention have structural units corresponding to the following general formula:

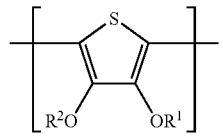

in which each of $R^1$ and $R^{-2}$ independently represents hydrogen or a $C_1$ to $C_4$ alkyl group or together represent a $C_1$ to $C_4$ alkylene group wherein the a $C_1$ to $C_4$ alkylene group may preferably comprise an ethylene group, an optionally alkyl substituted methylene group, an optionally $C_1$ to $C_{12}$ alkyl or phenyl-substituted 1,2-ethylene group, a 1,3-propylene group, or a 1,2-cyclohexylene group. These materials form polymer films with less color and better conductivity at lower coverage than the aforementioned group. The most preferred polythiophene suitable for the present invention is a poly(3,4-ethylenedioxythiophene), because of its commercial availability.

Component B can be any acicular substrate. However, in order to fully utilize the mechanical strength of the conductive particle, the acicular substrate is preferred to be inorganic. Any acicular inorganic material is suitable for this purpose. Examples can include oxides, borides, carbides, nitrides, halides, sulfides, sulfates, suicides, silicates, and various combinations thereof. Specifically, acicular substrates can be chosen from materials such as alumina, silica, magnesia, calcia, titania, tin oxide, indium oxide, yttria, zirconia, ceria, imogolite, allophane, zeolite, zinc antimonate, indium antimonate, titanium boride, niobium boride, zirconium boride, tantalum boride, chromium boride, tungsten boride, lanthanum boride, zirconium nitride, titanium nitride, silicon nitride, tungsten carbide, silicon carbide, sodium fluoride, calcium fluoride, magnesium fluoride, and the like. In order to obtain high degree of transparency, it is preferred that the refractive index of the acicular substrate is less than or equal to 2.1, and more preferably less than or equal to 1.6. The most preferred substrate for the invention can be selected from the group consisting of silica, alumina, magnesia, titania, imogolites, and combinations thereof for their availability and optimum physical properties.

The substrate, Component B, can have any suitable aspect ratio. In order to be effective, it is preferred that the aspect ratio is at least 2:1, but more preferably at least 5:1 and most preferably at least 10:1. Component B can comprise a single particle or multiple particles. In case of multiple particles, it is preferred that they form an elongated chain, such as those disclosed in U.S. Pat. No. 5,221,497.

Component B can be of any dimension. However, in order to minimize light scattering, component B should be ≦1 µm in length and preferably ≦500 nm in length. For applications where light scattering is not critical, the particles can be longer.

In a preferred embodiment Component B is colloidal in nature and is dispersed in a suitable medium, i.e., Component C. Some of the commercially available elongated silica sols, such as Snowtex-UP® dispersed in ethylene glycol or methanol, supplied by Nissan Chemical Industries, Ltd., are suitable examples. These particles are advertised in product literature to be 40–300 nm in length and 5–20 nm in width and are thus expected to provide a transparent high aspect ratio substrate. In a preferred embodiment, Component A is formed on such suitably dispersed Component B in Component C. Alternatively, Component A can be formed on Component B, and subsequently dispersed in Component C. Any suitable method known in the art, such as those described in U.S. Pat. Nos. 5,221,497, 5,693,259, and 6,291,535, and references therein can be used to form Component B.

Component C can be any suitable medium but preferably comprises an organic medium since most monomers for Component A are compatible with organic solvents, which can be either protic or non-protic. Preferred examples of Component C include protic solvents such as alcohols such as methanol, ethanol, n-propanol, isopropanol and butanol and others protic solvents including glycols such as ethylene glycol. The preferred medium is methanol as it is accepted as a low boiling point coating solvent in many industries.

In addition to Components A, B and C, the conductive particle of the invention may comprise any other addenda, such as surfactants and coating aids, plasticizers, adhesion promoting agents, coupling agents, compatibilizers, antioxidants, lubricants, dyes, pigments, other conductive agents, charge control agents, hardeners, viscosity control agents, binders and film forming agents, dispersants and the like.

The electronically conductive particle of the present invention may be prepared by providing at least one acicular substrate, for example Component B, combining at least one monomer, such as a monomer for Component A, the acicular substrate, and mixing at least one catalyst with the acicular substrate(s) and the monomer(s). The acicular substrate(s), catalyst(s), and the monomer(s) may be provided as a dispersion in a solvent. The ingredients may also be added in various orders. For example, the substrate may be added to the monomer, the catalyst may be combined with the substrate and added to the monomer. In one embodiment, a solvent may be added to the mixture of acicular substrate, monomer, and catalyst. In addition, other ingredients may be added to the mixture of substrate, monomer, and catalyst as necessary for their intended use. Such ingredients may include, but are not limited to, surfactants, coating aids, thickeners, coalescing aids, particle dyes, matte beads, and crosslinking agents.

In one preferred embodiment, a dispersion of Component B, preferably elongated silica sol, in Component C, preferably methanol, is first prepared. To this dispersion is added an appropriate amount of the monomer for the electronically conductive polymer, Component A, preferably one containing thiophene, under constant agitation. The monomers for use in the present invention may be selected from the group of monomers, which form the polymers of Component A, discussed above. For example, the monomer (3,4-ethylenedioxythiophene) may be used to form a preferred Component A, poly(3,4-ethylenedioxythiophene). Subsequently, an appropriate amount of catalyst, an oxidizing agent, preferably iron III toluenesulfonate, is added to this dispersion, also under constant agitation. Upon completion of the polymerization reaction, an electronically conductive polymer, Component A, is formed in contact with a high aspect ratio substrate particle, Component B, while dispersed in a medium or matrix, Component C, in accordance with the present invention. Such a dispersion can be further processed for any other purpose, such as purification, consolidation and the like, by dialyzing, diafiltering, filtering, washing, ion-exchanging, centrifuging, drying, freeze-drying, spray-drying, roto-vapping, or any method known in the art.

Catalysts for the oxidative polymerization of thiophene-containing monomers are preferably inexpensive and easy to handle. They include oxidants such as iron III salts, e.g. ferric chloride, ferric perchlorate, and the iron III salts of organic acids and inorganic acids containing organic residues, likewise, hydrogen peroxide, potassium dichromate, persulfates, such as alkali persulfate, ammonium persulfate, alkali perborates, potassium permanganate, and copper salts such as copper tetrafluoroborate. However, for the present invention most preferred catalysts, or oxidizing agents, include iron III salts of organic acids such as iron III p-toluenesulfonate. Monomer to catalyst/oxidizing agent weight ratio can vary widely. The ratio by weight of catalysts/oxidizing agent to monomer can range from 0.1:1 to 20:1 with 1:1 to 10:1 being preferred.

The electronically conductive particles comprising an acicular substrate in contact with an electronically conductive polymer of the invention may be incorporated into any article. Such an article can be of any size and form, such as sheet, rod, particulate, powder, fiber, wire, tube, paste, dispersion, woven, non-woven, support, layer in a multilayered structure, and the like. The particles of the invention may be dispersed in a matrix. The matrix may comprise an organic medium, for example, a solvent such as methanol, ethanol, n-propanol, isopropanol, butanol, and glycol. In other preferred embodiments, the matrix may comprise polymers, metals, ceramics, or glass. The particles incorporated into the matrix may be formed into an article or further incorporated into another article. The article can be made of any material including organics such as polymers and inter polymers, inorganics, such as metals, alloys, ceramics, glass, and any combinations thereof. The article of the invention can be an imaging element, display product based on organic or polymeric electroluminescence, liquid crystal or cathode ray tube, packaging product, woven or non-woven product, protective sheet or clothing, medical implement, sports article, and the like. In any such application the conductive particle can be incorporated in any amount either in the main implement or in any accessory or both.

Any method known in the art can be utilized to form an article comprising the conductive particle of the invention. Such methods of formation include but are not limited to extrusion, co-extrusion with or without orientation by uniaxial or biaxial, simultaneous or consecutive stretching, blow molding, injection molding, lamination, solvent casting, coating, drawing, spinning, cladding, etc. The conductive particle of the invention can be incorporated in the article by any of the aforesaid means or other methods known in the art.

In a preferred embodiment, the conductive particle of the invention is coated on to a suitable surface of the article. The surface may preferably comprise cellulose nitrate, cellulose acetate, poly(vinyl acetate), poly(vinyl alcohol), polystyrene, polyolefins including polyolefin ionomers, polyesters including polyester ionomers, polycarbonate, polyamide, polyimide, glass, natural and synthetic paper, resin-coated or laminated paper, voided polymers including polymeric foam, microvoided polymers and microporous materials, fabric, metals, ceramics or any combinations thereof. The surface of the article can be appropriately treated to ensure proper adhesion. Such treatments include acid etching, flame treatment, corona discharge treatment, glow discharge treatment, UV radiation treatment or can be coated with a suitable primer layer. However, corona discharge treatment is the preferred means for adhesion promotion.

In one embodiment the conductive particle of the invention is incorporated in an imaging element. Such imaging elements include those utilizing photographic, electrophotographic, electrostatographic, photothermographic, migration, electrothermographic, dielectric recording, thermal dye transfer, inkjet and other types of imaging. The conductive particle of the invention can be incorporated anywhere in the imaging element. Typical imaging elements are multilayered and the conductive particle can be incorporated in any layer. However, it is preferred that the conductive particle is incorporated in at least one outermost conductive layer to fully leverage its enhanced physical properties.

In addition to the conductive particle the aforementioned conductive layer may comprise any suitable amount of other addenda such as defoamers or coating aids, charge control agents, thickeners or viscosity modifiers, coalescing aids, crosslinking agents or hardeners, soluble and/or solid particle dyes, antifoggants, fillers, matte beads, inorganic or polymeric particles, binder, other antistatic or electrically conductive agents, adhesion promoting agents, bite solvents or chemical etchants, lubricants, plasticizers, antioxidants, voiding agents, colorants or tints, roughening agents, and other addenda that are well-known in the art.

The following examples illustrate the practice of this invention. They are not intended to be exhaustive of all possible variations of the invention. Parts and percentages are by weight unless otherwise indicated.

EXAMPLES

Example A

Preparation of Electronically Conductive Particles of the Invention 25 gms of an elongated silica sol Snowtex MA-ST-UP®, supplied by Nissan Chemical, containing 20% solids in methanol is placed under agitation at room temperature under inert atmosphere. To this sol is added 0.45 gms of 3,4-ethylenedioxythiophene Baytron M®, supplied by Bayer Corporation, and agitated for one hour by which time the monomer completely mixes in the system. Subsequently, 1.50 gms of Fe (III) toluenesulfonate, Baytron C®, also supplied by Bayer Corporation at 40% solids in butanol, is added and the reaction is allowed to proceed at room temperature for 48 hours. The dispersion obtained at the end of the process comprises the electronically conductive particle of the invention.

Examples 1–3

Coatings Comprising the Conductive Particles of the Invention

The following examples are coated with a coating rod from a dispersion similar to Example A described herein above, on cellulose triacetate film supports, with one side of the film support being previously coated with a gelatin based subbing layer. The subbing layer is typically provided on the film support for further incorporation of a photographic emulsion. The coatings of the invention are formed on either side of the film support, to demonstrate their versatility.

Durable, transparent electronically conductive coatings are formed upon drying of the coated layers. The surface electrical resistivity (SER) of these coatings are measured under different relative humidity (RH), with a Keithly Model 616 digital electrometer using a two point DC probe by a method similar to that described in U.S. Pat. No. 2,801,191, col. 4, lines 4–34.

The details of Examples 1–3 and their SER values are provided in the following Table 1.

TABLE 1

| Sample | Dry coverage of conductive layer | Conductive layer Un-subbed side | Conductive layer subbed side | SER log Ω/sq. 50% RH | SER log Ω/sq. 5% RH |
|---|---|---|---|---|---|
| Example. 1 | 340 mg/ft² | yes | no | 7.1 | 7.1 |
| Example. 2 | 110 mg/ft² | yes | no | 8.4 | 8.1 |
| Example 3 | 340 mg/ft² | no | yes | 8.2 | 7.9 |

It is clear from Table 1 that conductive layers comprising electronically conductive particles of the invention provide excellent SER. It is also clear that the conductive layers of the invention are suitable for use in a wide range of RH conditions. On a typical photographic support, the conductive layer of the invention can be coated on either side of the support, demonstrating its versatility.

The invention has been described in detail with particular reference to certain preferred embodiments thereof, but it will be understood that variations and modifications can be effected within the spirit and scope of the invention.

What is claimed is:

1. An article comprising conductive particles electronically conductive polymer-coated particles wherein said electronically conductive particles comprise an electronically conductive polymer coating on an acicular substrate, wherein said acicular substrate has a refractive index which is less than or equal to 1.6 and an aspect ratio of at least 5:1.

2. The article of claim 1 wherein said article is a sheet.

3. The article of claim 1 wherein said article is an injection molded part.

4. The article of claim 1 wherein said article is an imaging element.

5. The article of claim 1 wherein said article is a fiber.

6. The article of claim 1 wherein said particles form an elongated chain.

7. The article of claim 1 further comprising a matrix, wherein said electronically conductive polymer-coated particles are dispersed in said matrix.

8. The article of claim 7 wherein said matrix comprises a binder.

9. The article of claim 7 wherein said matrix comprises polymers, metals, ceramics, or glass.

10. The article of claim 7 wherein said conductive polymer-coated particles comprise a coating on the surface of said article.

11. The article of claim 10 wherein said surface comprises cellulose nitrate, cellulose acetate, poly(vinyl acetate), poly (vinyl alcohol), polystyrene, polyolefins including polyolefin ionomers, polyesters, polyester ionomers, polycarbonate, polyamide, polyimide, glass, natural paper, synthetic paper, resin-coated paper, laminated paper, voided polymers, polymeric foam, microporous material, fabric, metal, or ceramic.

12. The article of claim 10 wherein said surface is a treated surface.

13. The article of claim 12 wherein said treated surface is at least one member selected from the group consisting of acid etched surface, flame treated surface, corona discharge treated surface, glow discharge treated surface, UV radiation treated surface and primed surface.

14. The article of claim 10 wherein said surface is a corona discharge treated surface.

15. An electronically conductive polymer-coated particle comprising an acicular substrate coated with an electronically conductive polymer, wherein said acicular substrate has a refractive index which is less than or equal to 1.6 and an aspect ratio of at least 5:1.

16. The electronically conductive particle of claim 15 wherein said acicular comprises an inorganic acicular material.

17. The electronically conductive particle of claim 16 wherein said inorganic acicular material comprises at least one of oxides, borides, carbides, nitrides, halides, sulfides, sulfates, silicides, or silicates.

18. The electronically conductive particle of claim 15 wherein said acicular substrates comprises at least one member selected from the group consisting of alumina, silica, magnesia, calcia, titania, tin oxide, indium oxide, yttria, zirconia, ceria, imogolite, allophane, zeolite, zinc antimonate, indium antimonate, titanium boride, niobium boride, zirconium boride, tantalum boride, chromium boride, tungsten boride, lanthanum boride, zirconium nitride, titanium nitride, silicon nitride, tungsten carbide, silicon carbide, sodium fluoride, calcium fluoride, and magnesium fluoride.

19. The electronically conductive particle of claim 15 wherein said acicular substrate comprises at least one member selected from the group consisting of silica, alumina, magnesia, titania, and imogolites.

20. The electronically conductive particle of claim 15 wherein the acicular substrate comprises silica.

21. The electronically conductive particle of claim 15 wherein the acicular substrate comprises alumina.

22. The electronically conductive particle of claim 15 wherein the acicular substrate comprises titania.

23. The electronically conductive particle of claim 15 wherein said electronically conductive polymer is selected from the group comprising substituted and unsubstituted thiophene containing polymers and substituted and unsubstituted pyrrole containing polymers and substituted and unsubstituted aniline containing polymers.

24. The electronically conductive particle of claim 15 wherein said electronically conductive polymer comprises the following general formula:

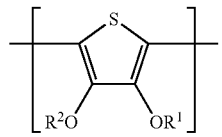

wherein: each of $R^1$ and $R^2$ independently represent hydrogen or a $C_1$ to $C_4$ alkyl group or together represent a substituted or unsubstituted $C_1$ to $C_4$ alkylene group, a substituted or unsubstituted methylene group, a substituted or unsubstituted 1,2-ethylene group, a 1,3-propylene group or a 1,2-cyclohexylene group.

25. The electronically conductive particle of claim 24 wherein said substituted $C_1$ to $C_4$ alkylene group comprises an ethylene group.

26. The electronically conductive particle of claim 24 wherein said substituted methylene group comprises an alkyl substituted group.

27. The electronically conductive particle of claim 24 wherein said substituted 1,2-ethylene group comprises a $C_1$ to $C_{12}$ alkyl or phenyl-substituted 1,2-ethylene group.

28. The electronically conductive particle of claim 24 wherein said electronically conductive polymer comprises poly(3,4-ethylenedioxythiophene).

29. The electronically conductive particle of claim 15 wherein said electronically conductive polymer comprises polyisothianaphthenes.

30. The electronically conductive particle of claim 15 wherein said acicular substrate has an aspect ratio greater than or equal to 5:1.

31. The electronically conductive particle of claim 15 wherein said acicular substrate has a length of less than or equal to 1 μm.

32. The electronically conductive particle of claim 15 wherein said particle is dispersed in an organic solvent.

33. The article of claim 32 wherein said solvent comprises at least one member selected from the group consisting of methanol, ethanol, n-propanol, isopropanol, butanol, and glycol.

34. The electronically conductive particle of claim 32 wherein said organic solvent comprises methanol.

35. The electronically conductive particle of claim 32 wherein said organic solvent comprises a protic solvent.

36. The electronically conductive particle of claim 32 wherein said organic solvent comprises a nonprotic solvent.

37. A method for making electronically conductive polymer-coated particles, said particles comprise an electronically conductive polymer coating on an acicular substrate, comprising providing at least one acicular substrate, wherein said acicular substrate has a refractive index which is less than or equal to 1.6 and an aspect ratio of at least 5:1, combining at least one monomer with said at least one acicular substrate, and mixing at least one catalyst with said at least one acicular substrate and said at least one monomer.

38. The method of claim 37 wherein said at least one acicular substrate comprises a dispersion of said acicular substrate in a solvent.

39. The method of claim 38 wherein said dispersion further comprises surfactants, coatingaids, thickeners, coalescing aids, particle dyes, matte beads, and crosslinking agents.

40. The method of claim 37 wherein said at least one monomer comprises a dispersion of said monomer in a solvent.

41. The method of claim 37 wherein said at least one catalyst comprises a dispersion of said catalyst in a solvent.

42. The method of claim 37 further comprising the step of adding a solvent to said mixture of acicular substrate, monomer, and catalyst.

43. The method of claim 37 wherein said acicular substrate comprises an inorganic acicular material.

44. The method of claim 43 wherein said inorganic acicular material comprises at least one of oxides, borides, carbides, nitrides, halides, sulfides, sulfates, silicides, or silicates.

45. The method of claim 37 wherein said acicular substrates comprises at least one member selected from the group consisting of alumina, silica, magnesia, calcia, titania, tin oxide, indium oxide, yttria, zirconia, ceria, imogolite, allophane, zeolite, zinc antimonate, indium antimonate, titanium boride, niobium boride, zirconium boride, tantalum boride, chromium boride, tungsten boride, lanthanum boride, zirconium nitride, titanium nitride, silicon nitride, tungsten carbide, silicon carbide, sodium fluoride, calcium fluoride, and magnesium fluoride.

46. The method of claim 37 wherein said acicular substrate comprises at least one member selected from the group consisting of silica, alumina, magnesia, titania, and imogolites.

47. The method of claim 37 wherein said acicular substrate comprises silica.

48. The method of claim 37 wherein said acicular substrate comprises alumina.

49. The method of claim 37 wherein said acicular substrate comprises titania.

50. The method of claim 37 wherein said monomer comprises at least one member selected from the group consisting of substituted and unsubstituted pyrroles, substituted and unsubstituted thiophenes, substituted and unsubstituted anilines, and isothianaphthenes.

51. The method of claim 37 wherein said monomer comprises 3,4-ethylenedioxythiophene.

52. The method of claim 37 wherein said catalyst comprises a persulfate.

53. The method of claim 37 wherein said catalyst comprises iron III salts.

54. The method of claim 53 wherein said catalyst comprises iron III-p-toluenesulfonate.

55. The method of claim 53 wherein said iron salts comprise ferric chloride or ferric perchiorate.

56. The method of claim 53 wherein said iron III salts comprise organic and inorganic acids, containing organic residues.

57. The method of claim 37 wherein said catalyst comprises at least one of hydrogen peroxide, potassium dichromate, alkali persulfate, potassium persulfate or ammonium persulfate, alkali perborates, or potassium permanganate.

58. The method of claim 37 wherein said catalyst comprises copper salts.

59. The method of claim 58 wherein said copper salt comprises copper tetrafluoroborate.

* * * * *